US007873211B1

(12) United States Patent
Grundmann et al.

(10) Patent No.: US 7,873,211 B1
(45) Date of Patent: Jan. 18, 2011

(54) CONTENT-AWARE VIDEO RESIZING USING DISCONTINUOUS SEAM CARVING

(75) Inventors: Matthias Grundmann, Atlanta, GA (US); Vivek Kwatra, Santa Clara, CA (US); Mei Han, Cupertino, CA (US)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 12/355,484

(22) Filed: Jan. 16, 2009

(51) Int. Cl.
*G06K 9/00* (2006.01)
*G06K 15/16* (2006.01)

(52) U.S. Cl. ............... 382/162; 709/203; 709/220; 382/284; 345/660

(58) Field of Classification Search ............... 709/203, 709/220, 232; 382/162, 284; 345/660
See application file for complete search history.

(56) References Cited

U.S. PATENT DOCUMENTS

| 7,787,664 | B2 * | 8/2010 | Luo et al. | 382/118 |
| 2008/0253685 | A1 * | 10/2008 | Kuranov et al. | 382/284 |
| 2010/0124371 | A1 * | 5/2010 | Jiang et al. | 382/162 |
| 2010/0201711 | A1 * | 8/2010 | Fillion et al. | 345/660 |

OTHER PUBLICATIONS

Avidan, S., et al. "Seam Carving for Content-Aware Image Resizing," International Conference on Computer Graphics and Interactive, ACM SIGGRAPH, 2007, 9 Pages.
Felzenszwalb, P., et al., "Efficient Graph-Based Image Segmentation," International Journal of Computer Vision, Sep. 2004, pp. 1-26, vol. 59, No. 2.
Kang, H., et al., "Flow-Based Image Abstraction," IEEE Transactions on Visualization and Computer Graphics, Jan./Feb. 2009, p. 62-76, vol. 15, No. 1.
Rubinstein, M., et al., "Improved Seam Carving for Video Retargeting," Transactions on Graphics ACM SIGGRAPH, 2007, pp. 1-9.
Winnemoeller, H., et al., "Real-time Video Abstraction," ACM Transactions on Graphics-TOG, 2008, 6 Pages.
Wolf, L., et al., "Non-homogeneous Content-driven Video-retargeting," In Proceedings of the Eleventh IEEE International Conference on Computer Vision (ICCV '07), 2007, pp. 1-6.

* cited by examiner

*Primary Examiner*—Khanh Q Dinh
(74) *Attorney, Agent, or Firm*—Fenwick & West LLP (57) ABSTRACT

A video is resized while preserving salient regions within the video. The dimensions of the video are reduced by selectively removing unimportant, or less salient, pixels from the video in a manner that diminishes any resulting spatial and temporal artifacts. More specifically, "seams" of pixels are selectively removed from frames of the video, where a "seam" is a horizontal or vertical chain of pixels through a frame. A seam can be selected from among all possible pixels in a row or column, thereby allowing discontinuous seams. Seams are selected using a technique that encourages the seam to pass through less-salient regions of the frame, and that reduces spatial artifacts when the video is played.

20 Claims, 8 Drawing Sheets

CONTENT-AWARE VIDEO RESIZING USING DISCONTINUOUS SEAM CARVING

BACKGROUND

1. Field of the Invention

This invention generally relates to manipulating video content and more specifically to resizing video content.

2. Description of the Related Art

The sharing of video content on websites has developed into a worldwide phenomenon, supported by dozens of websites. On average, over 10,000 videos are posted every day, and this number is increasing as the tools and opportunities for capturing video become easier to use and more widespread. Millions of people watch the posted videos.

There is often a need to resize shared videos. For example, videos can be resized to aspect ratios compatible with various electronic devices, such as mobile phones. Videos can also be resized in order to allow for higher-quality transcoding for a given bit-budget. In addition, videos can be resized in order to support the extraction of representative thumbnail images or video segments.

One simple way to resize a video is to uniformly scale all of the content within it. This technique scales both salient and non-salient regions of the video and can have undesirable consequences. If, for example, the video includes an image of a face in a scene also having grass field, a uniform resizing can cause the resized image to be dominated by the grass field and make the face difficult to discern. In most situations, the face within the video would be considered the more salient region, and thus the uniform resizing emphasizes the non-salient regions at the expense of the salient region. Videos can also be resized by cropping out the non-salient regions. However, cropping is not effective unless the salient regions are spatially-close within the frames of the video.

SUMMARY

The problems described above are addressed by a method, computer-readable storage medium, and computer system for resizing a video. An embodiment of the method selects a seam of pixels for a first frame of the video. The method further computes temporal coherence costs for pixels of a second frame of the video responsive to the selected seam for the first frame of video. The temporal coherence cost for a pixel indicates the cost of passing a seam for the second frame through the pixel. The method selects a seam of pixels for the second frame of the video responsive to the temporal coherence costs, and manipulates the seams of pixels for the first and second frames of the video to produce a resized video. The method further stores the resized video.

Embodiments of the computer-readable storage medium and computer system comprise computer program instructions for selecting a seam of pixels for a first frame of the video and computing temporal coherence costs for pixels of a second frame of the video responsive to the selected seam for the first frame of video. The instructions also select a seam of pixels for the second frame of the video responsive to the temporal coherence costs, manipulate the seams of pixels for the first and second frames of the video to produce a resized video, and store the resized video.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
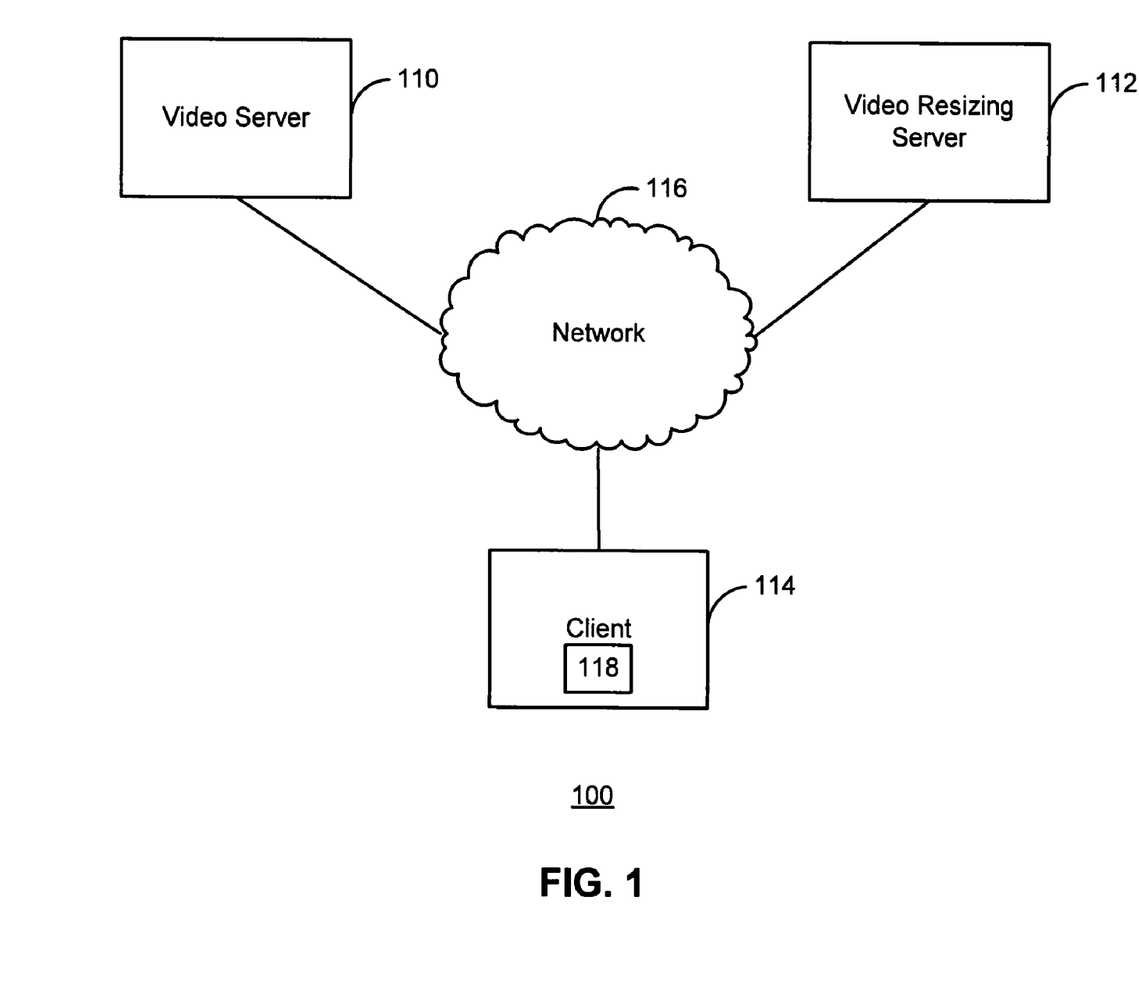
FIG. 1 is a high-level block diagram of a computing environment according to one embodiment.

FIG. 1 is a high-level block diagram of a computing environment 100 according to one embodiment. FIG. 1 illustrates a video server 110, a video resizing server 112 (the "resizing server") and a client 114 connected by a network 116. Only one client 114 is shown in FIG. 1 in order to simplify and clarify the description. Embodiments of the computing environment 100 can have thousands or millions of clients 114, as well as multiple video 110 and resizing servers 112.

The video server 110 serves video content (referred to herein as "videos") to clients 114 via the network 116. In one embodiment, the video server 110 is located at a website provided by YOUTUBE, LLC of San Bruno, Calif., although the video server can also be provided by another entity. The video server 110 includes a database storing multiple videos and a web server for interacting with clients 114. The video server 110 receives requests from users of clients 114 for the videos in the database and serves the videos in response. In addition, the video server 110 can receive, store, and serve videos posted by users of the clients 114 and by other entities.

The resizing server 112 resizes videos stored by the video server 110. The videos can be resized, for example, in order to support playback on various client devices having different display characteristics, to reduce storage requirements and/or support processing bandwidth requirements, or to allow portions of the video to be used as thumbnail representations. The resizing can be performed at the request of an administrator of the video server 110 or by a user of the client 114.

The resizing server 112 resizes a video while preserving salient regions within the video. The resizing operation can reduce or increase the size of the video. In one embodiment, the resizing server 112 reduces the dimensions of a video by selectively removing unimportant, or less salient, pixels from the video in a manner that diminishes any resulting spatial and temporal artifacts. More specifically, the resizing server 112 resizes a video to smaller dimensions by successively removing "seams" of pixels from frames of the video, where a "seam" is a horizontal or vertical chain of pixels through a frame. When defining a seam, the resizing server 112 can select from among all possible pixels in a row or column, thereby allowing discontinuous seams. The resizing server 112 selects seams using a technique that encourages the seam to pass through less-salient regions of the frame, and that reduces spatial artifacts when the video is played. In one embodiment, the resizing server 112 increases the dimensions of a video by duplicating, instead of removing, the seam.

The client 114 is a computer or other electronic device used by one or more users to perform activities including viewing videos and other content received from the video server 110. The client 114, for example, can be a personal computer executing a web browser 118 that allows the user to browse and search for videos available at the video server web site. In other embodiments, the client 114 is a network-capable device other than a computer, such as a personal digital assistant (PDA), a mobile telephone, a pager, a television "set-top box," etc.

The network 116 enables communications among the entities connected to it. In one embodiment, the network 116 is the Internet and uses standard communications technologies and/or protocols. Thus, the network 116 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
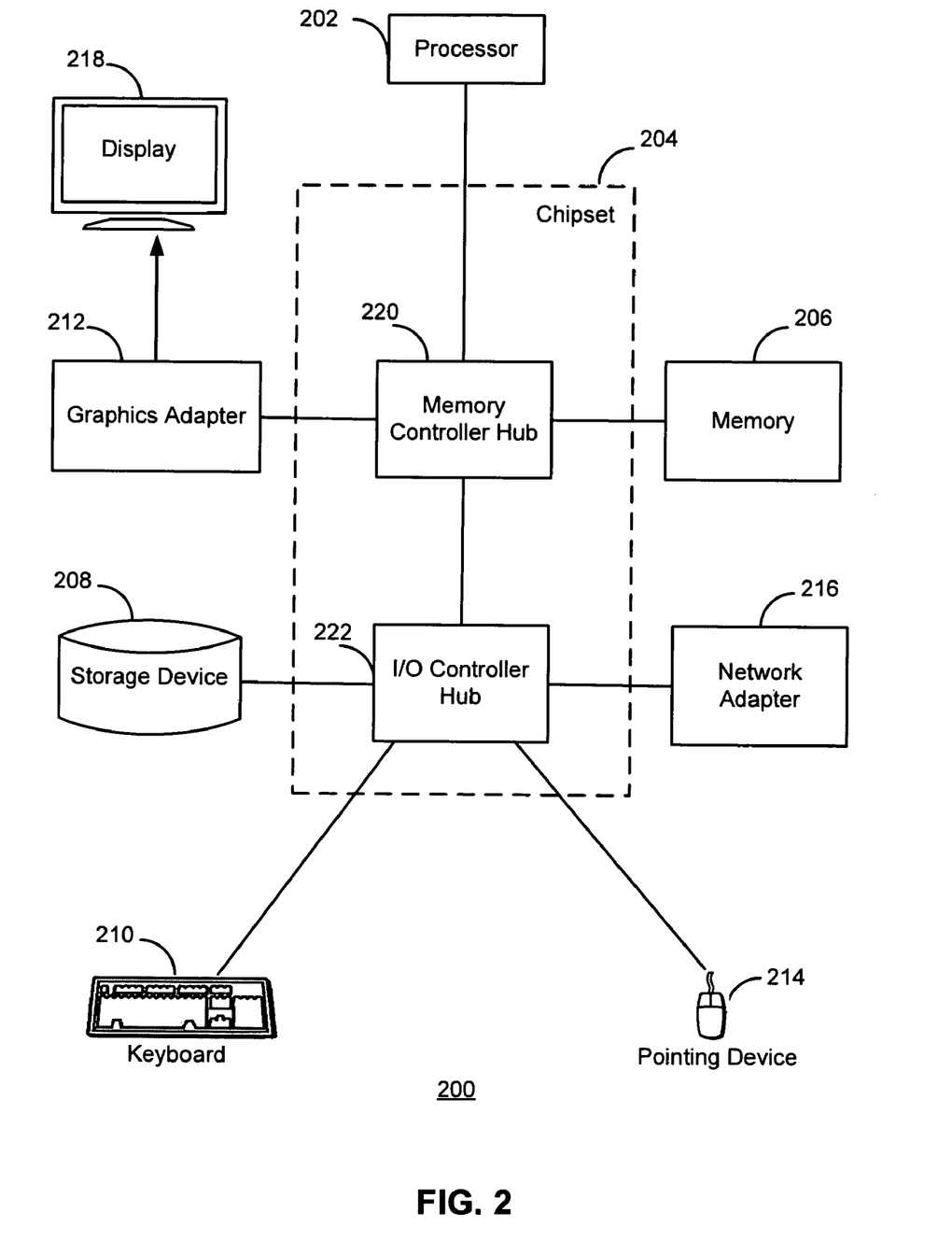
FIG. 2 is a high-level block diagram illustrating an example of a computer for use as a video server, resizing server, and/or client.

FIG. 2 is a high-level block diagram illustrating an example of a computer 200 for use as a video server 110, resizing server 112, and/or client 114. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 114 that is a mobile telephone typically has limited processing power, a small display 218, and might lack a pointing device 214. The resizing server 112, in contrast, may comprise multiple blade servers working together to provide the functionality described herein.

Figure 3:
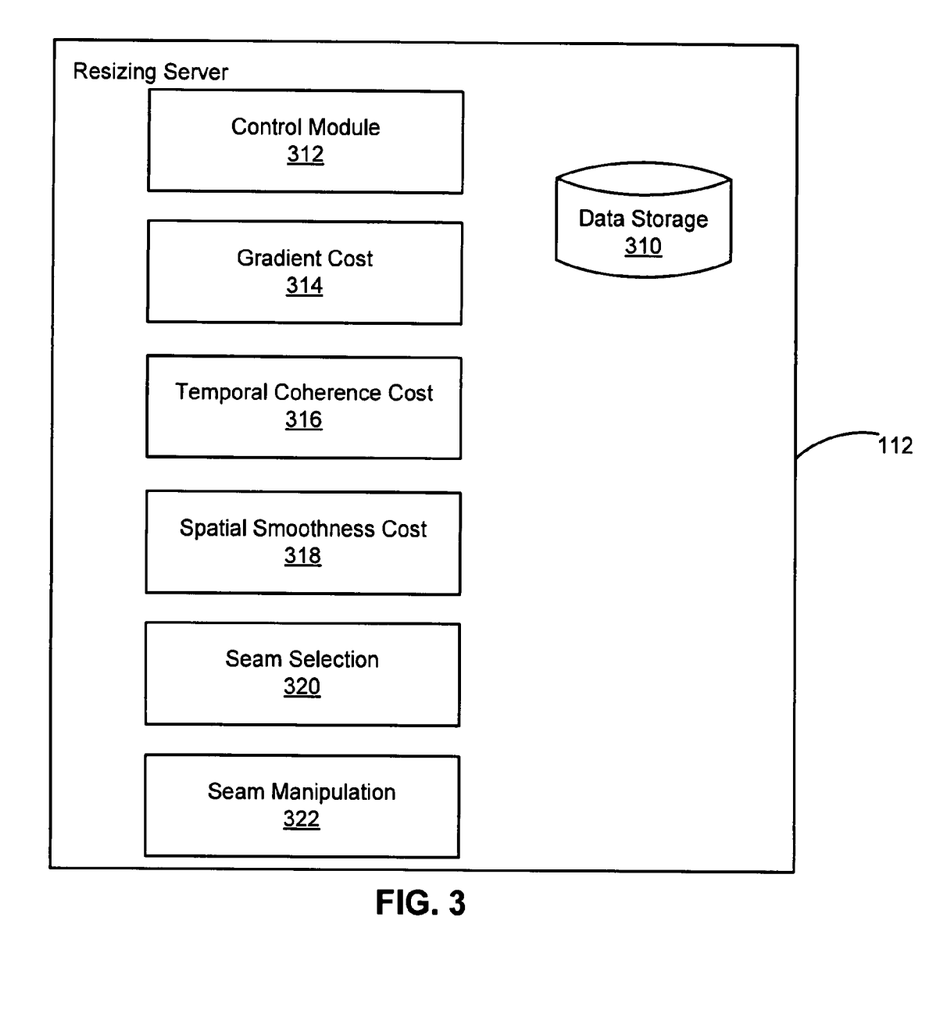
FIG. 3 is a high-level block diagram illustrating modules within the resizing server according to one embodiment.

FIG. 3 is a high-level block diagram illustrating modules within the resizing server 112 according to one embodiment. Some embodiments of the resizing server 112 have different and/or additional modules than the ones described here. Similarly, the functions can be distributed among the modules in a different manner than is described here. Certain modules and functions can be incorporated into other modules of the resizing server 112 and/or other entities on the network 116, including the video server 110 and client 114.

A data storage module 310 stores data used by the various modules of the resizing server 112. The stored data include videos undergoing resizing, frames of videos being operated upon, parameters related to the resizing, and data created during the resizing process. The data storage module 310 also stores resized videos, although such videos can be stored by the video server 110 as well.

A control module 312 controls the operation of the resizing server 112. In one embodiment, an administrator of the resizing server 112 interacts with the control module 312 to select a video for resizing and specify the resizing parameters. The resizing parameters include the type and/or amount of resizing to perform, such as the desired dimensions of the resized video. The control module 312 can provide a graphical user interface to an administrator for enabling these interactions.

In one embodiment, the resizing server 112 performs resizing via an iterative process. Each iteration manipulates one seam of pixels in the video along either the horizontal or vertical axis. The control module 312 controls the other modules of the resizing server 112 to perform the specified resizing through an appropriate number of iterations in each dimension. For purposes of clarity, the majority of this description focuses on an example of a single iteration removing a vertical seam. Removing such a seam decreases the width of the video. The techniques described herein can also be used to add a seam of pixels to increase the width of the video, and can likewise be used with a horizontal seam to change the height of the video.

A gradient cost module 314 calculates gradient costs for pixels within a frame of video. In a grayscale embodiment, a gradient magnitude is measured as the change in pixel intensity between adjacent pixels. Thus, for a pair of pixels the x-gradient magnitude can be measured as the absolute value of the rightmost pixel intensity minus the leftmost pixel intensity. Likewise, a y-gradient magnitude can be measured as the absolute value of the value of the bottommost pixel intensity minus the value of the topmost pixel intensity. In a color embodiment, the gradient magnitude is measured in the same manner except that the gradient magnitude is measured as the sum of gradient magnitudes in all color channels. The gradient cost module 314 calculates the gradient cost for each pixel of the frame as the sum of the gradient magnitudes between the pixel and its adjacent pixels (e.g., the pixels above, below, left, and right of the pixel).

A temporal coherence cost module 316 calculates temporal costs for pixels within a frame. In general, the temporal coherence cost measures the impact on video smoothness of passing the seam through a particular pixel. A higher temporal coherence cost correlates to a higher chance that there will be an undesirable visual artifact (also called a "temporal artifact") in the resulting video if the seam passes through the pixel.

In one embodiment, the temporal coherence cost for a pixel is the sum of the gradient magnitudes of all pixels along the axis from that pixel to the pixel at the location of the seam selected in the previous frame. For example, assume a given row of a frame is 20 pixels (columns) wide, and that the vertical seam selected for the previous frame passes through the row at column 10. The temporal coherence cost for the leftmost pixel in the row ($p_1$) is the sum of the absolute values of the gradient magnitudes of pixels 2-10 in the same row, i.e., $|p_2-p_1|+|p_3-p_2|+ \ldots +|p_{10}-p_9|$. Similarly, the temporal coherence cost for the rightmost pixel in the row ($p_{20}$) is the sum of the absolute values of the gradient magnitudes of pixels 10-20 in the row, i.e., $|p_{11}-p_{10}|+|p_{12}-p_{11}|+ \ldots +|p_{20}-p_{19}|$.

A spatial smoothness cost module 318 calculates spatial smoothness cost for transitions between pixels in adjacent rows in a frame. The spatial smoothness cost represents an impact on spatial smoothness resulting from passing the seam through a pixel in a given column (i.e., likelihood that passing the seam through that pixel will produce an artifact in the video). In one embodiment, the spatial smoothness cost module 318 calculates the spatial smoothness costs for all possible paths for the seam (i.e., from each pixel in a row to each pixel in a subsequent row).

In one embodiment, the spatial smoothness cost is calculated as a measurement of the change in vertical gradients (e.g., the gradient between a pixel and the pixel immediately below it) that is produced if the seam transitions between a pair of pixels. For a pair of pixels in adjacent rows, where the topmost pixel is also the leftmost pixel, the spatial smoothness cost module 318 calculates the cost as the absolute difference between the y-gradient magnitude and the diagonal gradient magnitude (bottom-left to top-right) from the column of the leftmost pixel to the column prior to the rightmost pixel summed with the absolute difference between the y-gradient magnitude and the diagonal gradient magnitude from the column after the leftmost pixel to the column of the rightmost pixel. If the leftmost pixel of the pair is in the bottom row, the direction of the diagonals is reversed. The calculation of the spatial smoothness cost is explained in more detail in connection with FIG. 7.

A seam selection module 320 selects a seam for a frame of video based on the costs assigned to the pixels and the spatial smoothness cost. In general, the seam selection module 320 selects as the seam the least-cost path (also called the "lowest energy path") through the frame in the desired dimension. The costs for the path include the costs assigned to the pixels and the spatial smoothness costs. Thus, for a vertical seam, the seam selection module 320 identifies a path along the y-axis (e.g., top to bottom) having the lowest cumulative pixel and spatial smoothness costs. In one embodiment, the seam selection module 320 formulates the seam selection process as a constraint satisfaction problem and selects the seam using dynamic programming-based techniques.

The pixel cost used by the seam selection module 320 depends on the position of the frame within the video. For the first frame, the cost for a given pixel is equal to that pixel's gradient cost. For frames subsequent to the first frame, the cost for a given pixel is the sum of that pixel's gradient and temporal coherence costs.

Using the spatial smoothness costs in this manner allows for discontinuous seams. The path of the seam can pass through any column of a frame as it moves through the rows. The spatial smoothness cost, however, leads to a seam selection that reduces artifacts in the resized video.

A seam manipulation module 322 manipulates a selected seam of a frame of the video. If the video is being reduced, the seam manipulation module 322 removes the pixels forming the seam of a given frame and collapses the image. Removing the seam effectively reduces the dimension of the frame along the axis orthogonal to the seam. Thus, removing a vertical seam reduces the width of the frame by one column. If the video is being enlarged, the seam manipulation module 322 duplicates the pixels in the seam. For example, for a vertical seam the seam manipulation module 322 can create a new column adjacent to the pixel on the seam of a given row and insert a duplicate of the pixel into the new column. In one embodiment, the seam manipulation module 322 removes the seam from a frame upon selection of the seam. In another embodiment, the seam manipulation module 322 removes the seams after seams have been selected for all of the frames of the video.

Figure 4:
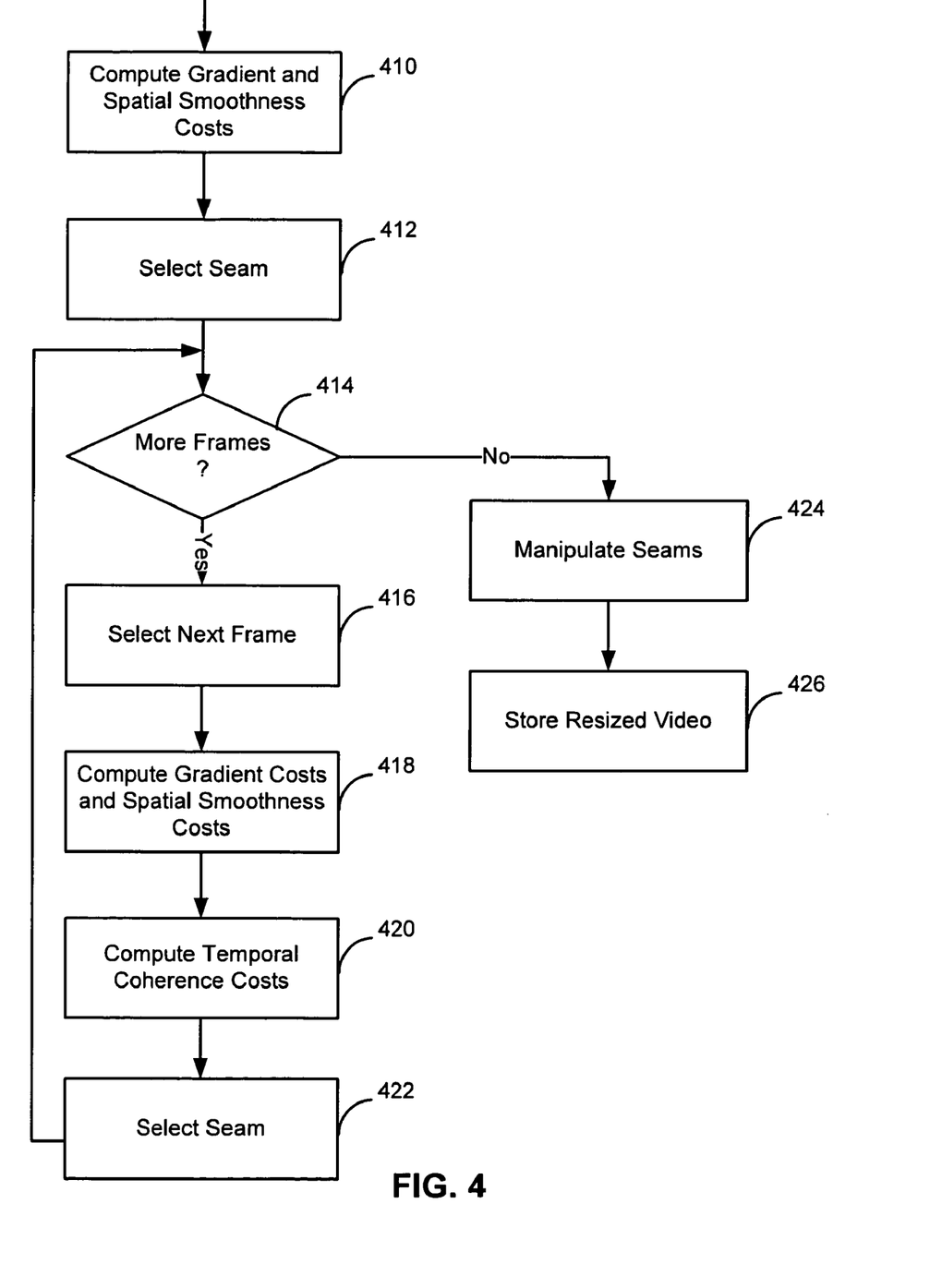
FIG. 4 is a flowchart illustrating steps performed by the resizing server to resize a video according to one embodiment.

FIG. 4 is a flowchart illustrating steps performed by the resizing server 112 to resize a video according to one embodiment. Other embodiments perform different steps than those shown in the figure and perform the steps in different orders. In addition, some or all of the steps can be performed by entities other than the resizing server 112.

The resizing server 112 initially operates on the first frame of the video. The frame is the "first" in the sense that it represents an arbitrary frame in the video at which the resizing is initiated, and need not be the literal first frame of the video. The resizing server 112 computes 410 the gradient and spatial smoothness costs 410 for the frame.

Each pixel's gradient cost is the sum of the gradient magnitudes between the pixel and each of its adjacent pixels. The spatial smoothness cost is the cost of transitioning between pixels in adjacent rows. The resizing server 112 selects 412 a lowest cost path through the image. The selected path defines the seam for the frame.

If 414 there are additional frames of the video, the resizing server selects 416 the next frame and computes 418 gradient and spatial smoothness costs for the pixels of the frame using the same technique described above. In addition, the resizing server 112 computes 420 temporal coherence costs for the pixels in the frame. The temporal coherence cost is based in part on the seam selected in the previous frame. The resizing server 112 selects 422 a seam for the frame based on the gradient, temporal coherence, and spatial smoothness costs. In one embodiment, the resizing server 112 sums the gradient and temporal coherence costs per pixel.

The resizing server 112 manipulates 424 the selected seams in the frames of the video, typically by either removing or duplicating the seams. The resizing server 112 stores 426 the resized video. This resizing process can be repeated multiple times in either dimension in order to achieve a desired aspect ratio for the video. The resizing server 112 can then provide the resized video to the video server 110, which in turn can provide the resized video to clients 114 for display.

As mentioned above, the seam pixels for a vertical seam are selected from among all possible pixels in the subsequent row, thereby allowing discontinuous seams. While seams of different frames can therefore lack temporal coherence (i.e., seams selected for adjacent frames need not be similar), the use of the spatial smoothness and temporal coherence cost provides a compromise between smoothness, coherence, and the introduced artifacts. The seam in the new frame should cause the new frame to match the appearance predicted by the seam from the previous frame. Thus, selecting a seam based on these costs provides an outcome that is similar to using temporal coherence and smoothness to select the seam. In addition, this technique is able to preserve salient regions as the regions change temporally.

Figure 5:
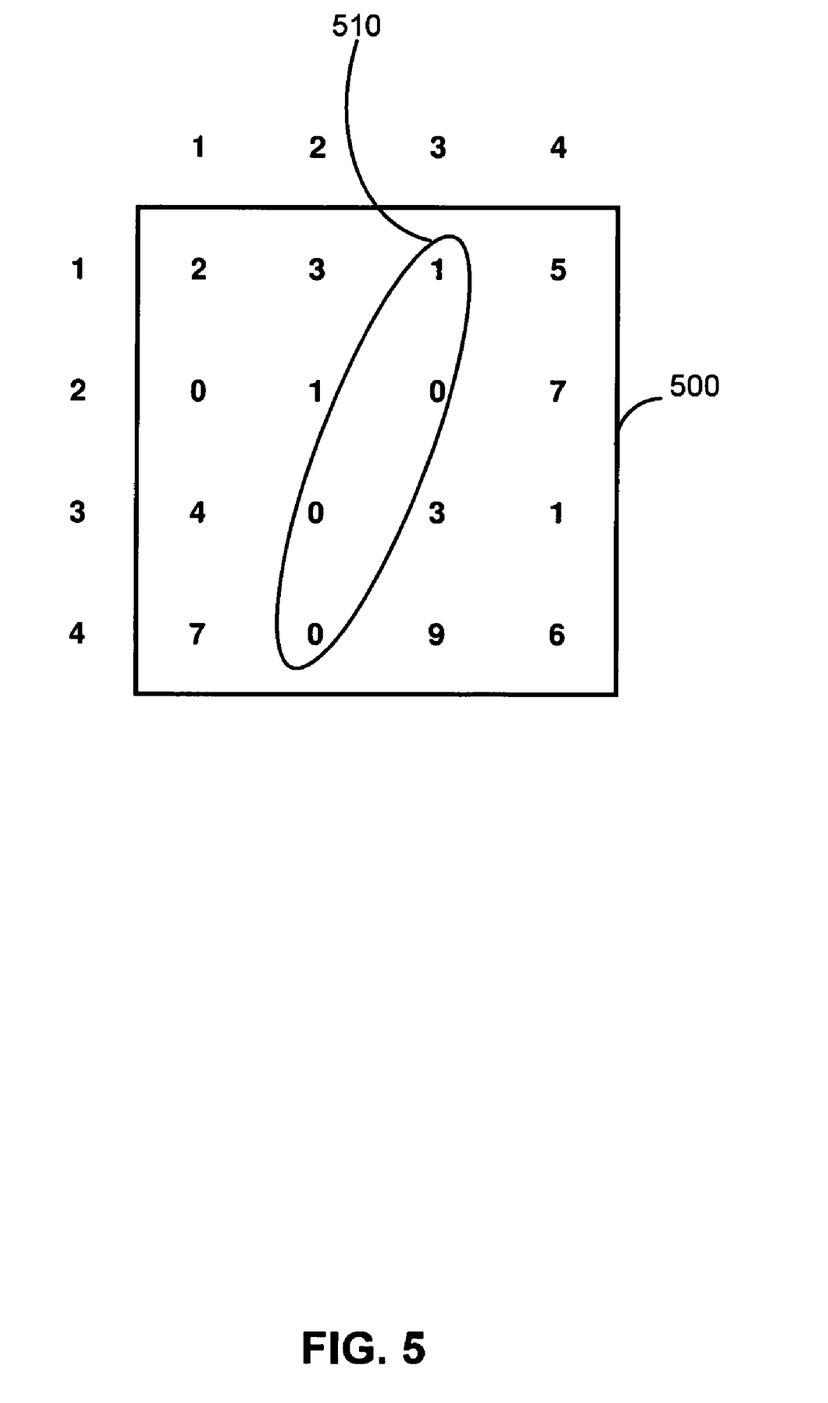
FIG. 5 illustrates a sample frame having a seam.

FIG. 5 illustrates a sample frame 500 having a seam 510. The frame 500 has four rows and four columns, and each of the sixteen pixels within the frame has a cost associated with it. The cost can be, for example, the gradient cost or the sum of the gradient and temporal coherence costs. In this example there is a vertical seam 510 that follows the lowest-cost path through the image. Here, the total cost is 1.

Figure 6A:
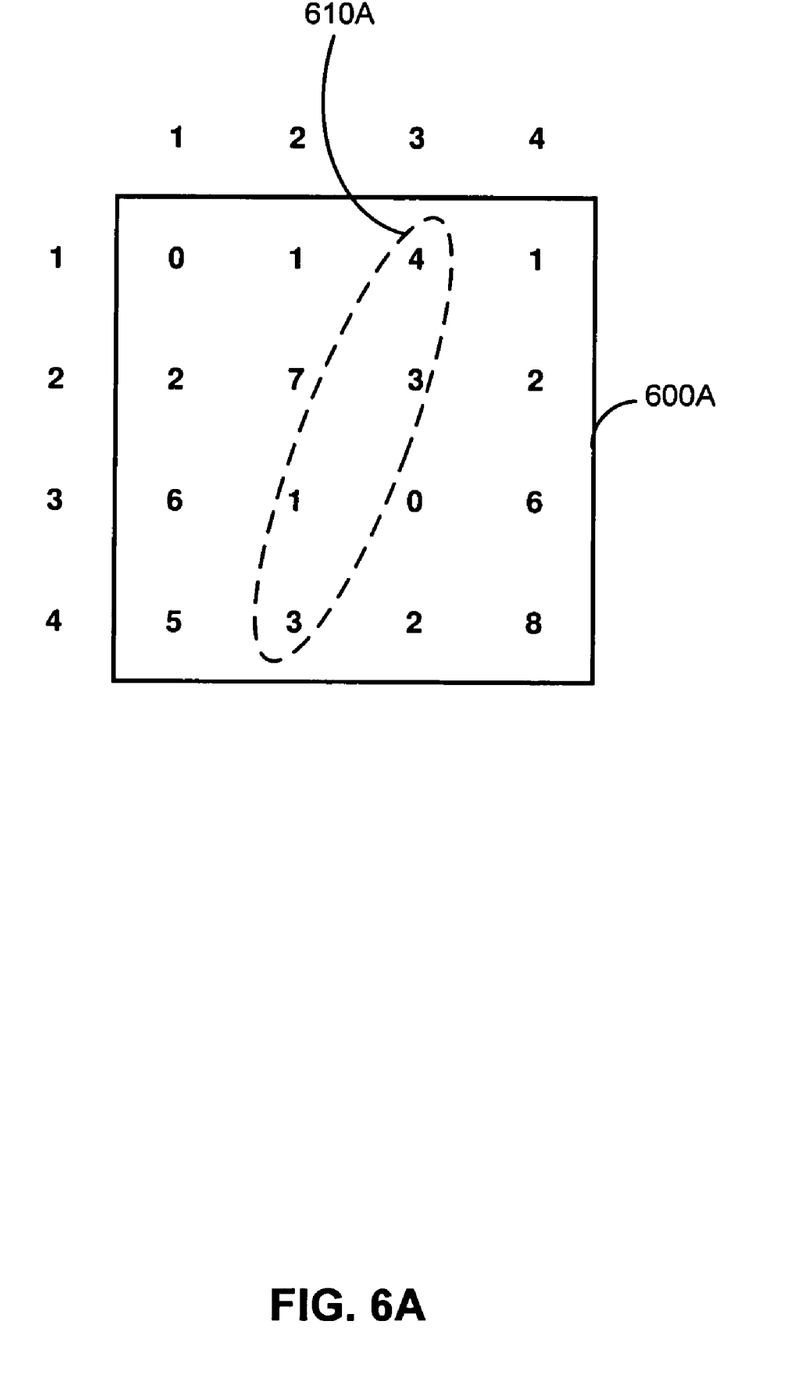
FIGS. 6A and 6B illustrate different views of the frame subsequent to the frame of FIG. 5.
Figure 6B:
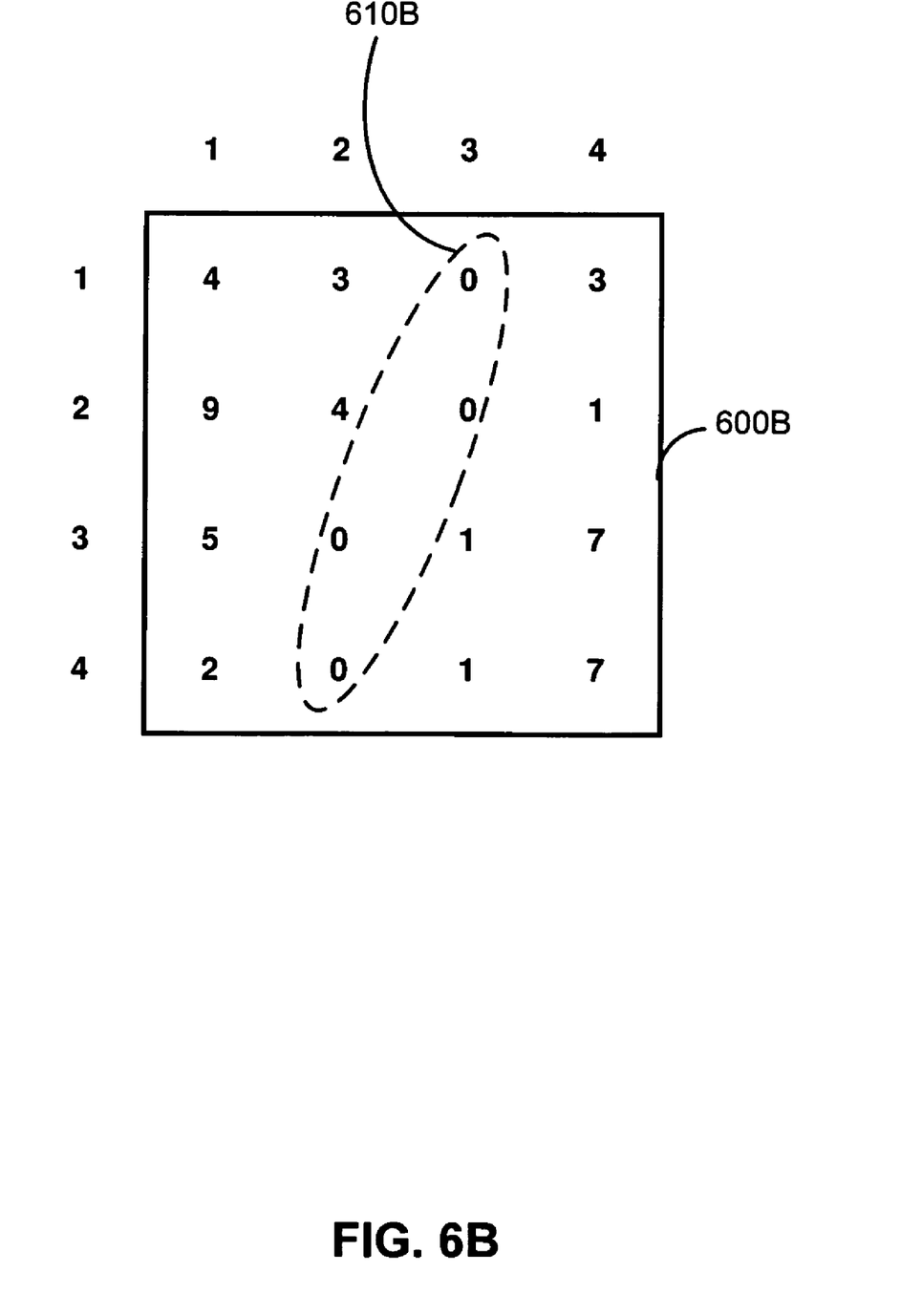

FIGS. 6A and 6B illustrate different views of the frame 600A, 600B subsequent to the frame 500 of FIG. 5. Each frame 600A, 600B illustrates the seam 510 of FIG. 5 using a dashed line 610A, 610B. In FIG. 6A, the value associated with each of the 16 pixels represents the pixel intensity instead of the pixel cost.

In FIG. 6B, the value associated with each of the 16 pixels represents the temporal coherence cost as calculated based on the pixel intensities shown in FIG. 6A and the seam 510 from the frame 500 of FIG. 5. For example, the temporal coherence cost of the pixel at column 1, row 2 ($P_{1,2}$) is $|P_{1,2}-P_{2,2}|+|P_{2,2}-P_{3,2}|$, or $|-5|+|4|=9$. The temporal coherence cost of pixel $P_{2,2}$ is $|P_{2,2}-P_{3,2}|=4$. The temporal coherence cost of pixel $P_{4,2}$ is $|P_{3,2}-P_{4,2}|=1$. As shown in FIG. 6B, the temporal coherence costs for the pixels in the seam 610B selected for the previous frame are zero. In use, an embodiment of the resizing server 112 would sum the temporal coherence costs of the pixels in the frame of FIG. 6B with the gradient costs for the pixels, and then select a new seam for the frame. This new seam would then be used to compute the temporal coherence costs for the subsequent frame.

Figure 7:
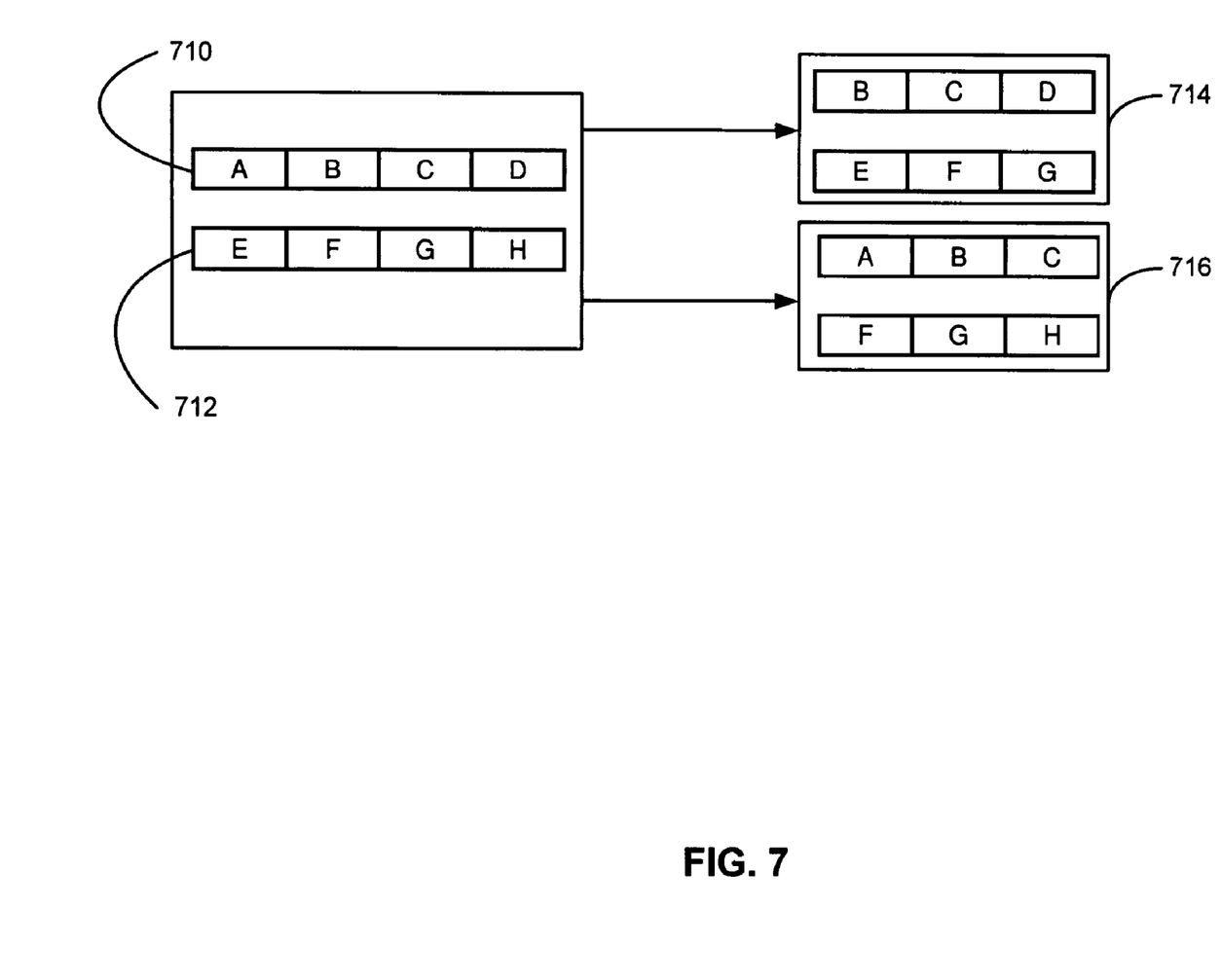
FIG. 7 illustrates two rows of four pixels each, such as pixels from rows of a frame of video, and is useful for explaining how spatial smoothness costs are calculated.

FIG. 7 illustrates two rows of four pixels each 710, 712, such as pixels from rows of a frame of video, and is useful for explaining how spatial smoothness costs are calculated. The pixels in the top row 710 are labeled "A" through "D" and the pixels in the bottom row 712 are labeled "E" through "H." The spatial smoothness cost between pixels A and H is calculated as: $(\|AE|-|BE\|+\|BF|-|CF\|+\|CG|-|DG\|)+(\|BF|-|BE\|+\|CG|-|CF\|+\|DH|-|DG\|)$, where a pair of pixels listed together (e.g., "AE") refers to the gradient magnitude between the pixels. If the pixel on the top row is the rightmost pixel, the calculation is reversed. Thus, the spatial smoothness cost between pixels E and D is calculated as: $(\|AE|-|AF\|+\|BF|-|BG\|+\|CG|-|CH\|)+(\|BF|-|AF\|+\|CG|-|BG\|+\|DH|-|CH\|)$. This spatial smoothness cost calculation compares the vertical gradients before the seam is applied with the vertical gradients that would be produced if the seam were applied to the pair of pixels. The pixels resulting if the seam passes through pixels A and H is shown by the pair of pixel rows labeled "714" and the pixels resulting if the seam passes through pixels E and D is shown by the pair of pixel rows labeled "716."

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of using a computer to resize a video, comprising:
    selecting a seam of pixels for a first frame of the video;
    computing temporal coherence costs for pixels of a second frame of the video responsive to the selected seam for the first frame of video, a temporal coherence cost for a pixel indicating a cost of passing a seam for the second frame through the pixel;
    selecting a seam of pixels for the second frame of the video responsive to the temporal coherence costs;
    manipulating the seams of pixels for the first and second frames of the video to produce a resized video; and
    storing the resized video.

2. The method of claim 1, wherein selecting a seam of pixels for the first frame of the video comprises:
    computing gradient costs for the pixels in the first frame, a gradient cost for a pixel in the first frame indicating a change in pixel intensity between the pixel in the first frame and adjacent pixels in the first frame; and selecting a path through the first frame as the seam of pixels for the first frame responsive to the gradient costs.

3. The method of claim 1, further comprising:
    computing spatial smoothness costs for transitions between pixels of the second frame, a spatial smoothness cost indicating a cost of passing the seam for the second frame from a first pixel to a second pixel;
    wherein selecting the seam of pixels for the second frame comprises selecting the seam of pixels responsive to the temporal coherence costs and the spatial smoothness costs.

4. The method of claim 1, wherein computing temporal coherence costs for pixels of a second frame comprises:
    determining a sum of gradient magnitudes of pixels along an axis from a first pixel in the second frame to a second pixel in the second frame, the second pixel at a location of the seam selected for the first frame of the video.

5. The method of claim 1, wherein selecting a seam of pixels for the second frame of the video comprises:
    computing gradient costs for the pixels in the second frame, a gradient cost for a pixel in the second frame indicating a change in pixel intensity between the pixel in the second frame and adjacent pixels in the second frame;
    combining the temporal coherence costs for the pixels of the second frame and the gradient costs for the pixels of the second frame to produce pixel costs for the pixels of the second frame; and
    selecting a path through the second frame as the seam of pixels for the second frame responsive to the pixel costs.

6. The method of claim 1, wherein manipulating the seams of pixels for the first and second frames of the video comprises:
    removing the seams of pixels for the first and second frames from the respective frames; and
    collapsing the first and second frames around the removed seams of pixels to produce a reduced video.

7. The method of claim 1, wherein the video comprises a set of temporally ordered frames and wherein the first frame occurs immediately prior to the second frame in the temporal order.

8. A computer-readable non-transitory storage medium storing executable computer program instructions for resizing a video, the computer program instructions comprising instructions for:
    selecting a seam of pixels for a first frame of the video;
    computing temporal coherence costs for pixels of a second frame of the video responsive to the selected seam for the first frame of video, a temporal coherence cost for a pixel indicating a cost of passing a seam for the second frame through the pixel;
    selecting a seam of pixels for the second frame of the video responsive to the temporal coherence costs;

manipulating the seams of pixels for the first and second frames of the video to produce a resized video; and storing the resized video.

9. The computer-readable storage non-transitory medium of claim 8, wherein the instructions for selecting a seam of pixels for the first frame of the video comprise instructions for:

computing gradient costs for the pixels in the first frame, a gradient cost for a pixel in the first frame indicating a change in pixel intensity between the pixel in the first frame and adjacent pixels in the first frame; and selecting a path through the first frame as the seam of pixels for the first frame responsive to the gradient costs.

10. The computer-readable non-transitory storage medium of claim 8, further comprising instructions for:

computing spatial smoothness costs for transitions between pixels of the second frame, a spatial smoothness cost indicating a cost of passing the seam for the second frame from a first pixel to a second pixel;

wherein selecting the seam of pixels for the second frame comprises selecting the seam of pixels responsive to the temporal coherence costs and the spatial smoothness costs.

11. The computer-readable non-transitory storage medium of claim 8, wherein the instructions for computing temporal coherence costs for pixels of a second frame comprise instructions for:

determining a sum of gradient magnitudes of pixels along an axis from a first pixel in the second frame to a second pixel in the second frame, the second pixel at a location of the seam selected for the first frame of the video.

12. The computer-readable non-transitory storage medium of claim 8, wherein the instructions for selecting a seam of pixels for the second frame of the video comprise instructions for:

computing gradient costs for the pixels in the second frame, a gradient cost for a pixel in the second frame indicating a change in pixel intensity between the pixel in the second frame and adjacent pixels in the second frame;

combining the temporal coherence costs for the pixels of the second frame and the gradient costs for the pixels of the second frame to produce pixel costs for the pixels of the second frame; and selecting a path through the second frame as the seam of pixels for the second frame responsive to the pixel costs.

13. The computer-readable non-transitory storage medium of claim 8, wherein the instructions for manipulating the seams of pixels for the first and second frames of the video comprise instructions for:

removing the seams of pixels for the first and second frames from the respective frames; and collapsing the first and second frames around the removed seams of pixels to produce a reduced video.

14. The computer-readable non-transitory storage medium of claim 8, wherein the video comprises a set of temporally-ordered frames and wherein the first frame occurs immediately prior to the second frame in the temporal order.

15. A computer system for resizing a video, the computer system comprising:

a computer-readable non-transitory storage medium storing executable computer program instructions comprising instructions for:

selecting a seam of pixels for a first frame of the video;

computing temporal coherence costs for pixels of a second frame of the video responsive to the selected seam for the first frame of video, a temporal coherence cost for a pixel indicating a cost of passing a seam for the second frame through the pixel;

selecting a seam of pixels for the second frame of the video responsive to the temporal coherence costs;

manipulating the seams of pixels for the first and second frames of the video to produce a resized video; and storing the resized video; and a processor configured to execute the computer program instructions stored on the computer-readable non-transitory storage medium.

16. The computer system of claim 15, wherein the instructions for selecting a seam of pixels for the first frame of the video comprise instructions for:

computing gradient costs for the pixels in the first frame, a gradient cost for a pixel in the first frame indicating a change in pixel intensity between the pixel in the first frame and adjacent pixels in the first frame; and selecting a path through the first frame as the seam of pixels for the first frame responsive to the gradient costs.

17. The computer system of claim 15, further comprising instructions for:

computing spatial smoothness costs for transitions between pixels of the second frame, a spatial smoothness cost indicating a cost of passing the seam for the second frame from a first pixel to a second pixel;

wherein selecting the seam of pixels for the second frame comprises selecting the seam of pixels responsive to the temporal coherence costs and the spatial smoothness costs.

18. The computer system of claim 15, wherein the instructions for computing temporal coherence costs for pixels of a second frame comprise instructions for:

determining a sum of gradient magnitudes of pixels along an axis from a first pixel in the second frame to a second pixel in the second frame, the second pixel at a location of the seam selected for the first frame of the video.

19. The computer system of claim 15, wherein the instructions for selecting a seam of pixels for the second frame of the video comprise instructions for:

computing gradient costs for the pixels in the second frame, a gradient cost for a pixel in the second frame indicating a change in pixel intensity between the pixel in the second frame and adjacent pixels in the second frame;

combining the temporal coherence costs for the pixels of the second frame and the gradient costs for the pixels of the second frame to produce pixel costs for the pixels of the second frame; and selecting a path through the second frame as the seam of pixels for the second frame responsive to the pixel costs.

20. The computer system of claim 15, wherein the instructions for manipulating the seams of pixels for the first and second frames of the video comprise instructions for:

removing the seams of pixels for the first and second frames from the respective frames; and collapsing the first and second frames around the removed seams of pixels to produce a reduced video.

* * * * *